United States Patent [19]
Ramachandran

[11] Patent Number: 5,827,610
[45] Date of Patent: Oct. 27, 1998

[54] CHITOSAN-COATED PULP, A PAPER USING THE PULP, AND A PROCESS FOR MAKING THEM

[75] Inventor: Seshadri Ramachandran, Chesterfield, Va.

[73] Assignee: E. I. du Pont de Nemours and Company, Wilmington, Del.

[21] Appl. No.: 781,331

[22] Filed: Jan. 10, 1997

[51] Int. Cl.⁶ .................................................. D02G 3/00
[52] U.S. Cl. .................... 428/361; 428/357; 428/359; 428/364; 428/395
[58] Field of Search .................... 428/357, 359, 428/361, 395, 364

[56] References Cited

U.S. PATENT DOCUMENTS

| | | |
|---|---|---|
| 5,324,811 | 6/1994 | You et al. . |
| 5,366,781 | 11/1994 | Colburn et al. . |
| 5,532,059 | 7/1996 | Lee . |

FOREIGN PATENT DOCUMENTS

| | | |
|---|---|---|
| 0 123 312 | 4/1984 | European Pat. Off. . |
| 62-72938 | 4/1987 | Japan . |
| 62-94273 | 4/1987 | Japan . |
| 2-002303 | 1/1990 | Japan . |
| 3167388 | 7/1991 | Japan . |
| 4312458 | 11/1992 | Japan . |
| 6081299 | 3/1994 | Japan . |
| 819123 | 2/1958 | United Kingdom . |

OTHER PUBLICATIONS

G. G. Allan et al, Chitosan–Coated Fibers, *Elsevier Applied Science*, pp. 765–776, 1989.

G. G. Allan et al., Marine Polymers, V. Modification of Paper, *Cellulose Technology Research*, pp. 172–180, undated.

*Primary Examiner*—William Krynski
*Assistant Examiner*—J. M. Gray

[57] ABSTRACT

A coated aramid fiber is disclosed wherein the coating is a small amount of chitosan and the coated fiber is useful in manufacture of an improved friction paper. An improved friction paper is, also, disclosed wherein chitosan is present throughout the paper as a coating on all components.

4 Claims, No Drawings

CHITOSAN-COATED PULP, A PAPER USING THE PULP, AND A PROCESS FOR MAKING THEM

BACKGROUND OF THE INVENTION

1. Field of the Invention

This invention relates to pulp, papers made from such pulp, and to methods for making such pulp and such papers. The papers of this invention include aramid pulp with chitosan as an additive and they perform especially well at high temperatures and under other extreme conditions.

2. Description of the Prior Art

Japanese laid-open patent application 90-2303, published Jan. 8, 1990, discloses use of chitosan as a coating on sheets made from natural fibers to increase the strength of the sheets in water. The sheets are biodegradable and are used in agricultural applications for plantings.

European Patent Application 123,312, published Oct. 31, 1984, discloses a friction paper which includes aromatic polyamide fibers, fillers, and other materials, impregnated with a curable, thermosetting resin. The resin is present in the paper at from 15 to 60 weight percent.

SUMMARY OF THE INVENTION

This invention relates to an aramid fiber having a length of 0.15 to 10 millimeters, a surface area of 0.5 to 20 square meters per gram and a coating of chitosan in the amount of 1 to 10 percent, based on the weight of the fiber. The aramid fiber, in the form of pulp or a floc, can be a fiber component of a paper comprising 5 to 95 percent, by weight, aramid fiber, 0 to 20 percent, by weight, binder material, and 10 to 80 percent, by weight, inorganic filler, wherein the aramid fiber has a coating of chitosan in the amount of 1 to 10 percent, based on the weight of the fiber.

The coated aramid fiber can be made by dispersing uncoated fiber in an aqueous solution of chitosan and adjusting the pH of the solution to precipitate the chitosan onto the fibers. Coated pulp can, also, be made by refining uncoated floc in a solution of chitosan to yield a dispersion of pulp in the solution; and, then, adjusting the pH to precipitate the chitosan. Coated floc can be made by so-precipitating chitosan onto a dispersion of floc.

Paper can be made by combining the chitosan-coated aramid pulp of this invention with other, usual, components of an aramid paper on a paper making machine; and it can, also, be made by combining all of the components of an aramid paper and adding the chitosan, for example as an aqueous solution, at the paper making machine.

DETAILED DESCRIPTION

It is generally observed that as the aramid fiber content of a paper increases, the friction coefficient of the paper decreases and the dispersion of fibers in the paper becomes nonuniform. Use of shorter aramid fibers improves uniformity of fiber dispersion but results in a decrease in paper strength leading to processing problems during the paper making. It is desirable to use a shorter aramid fiber with improved paper strength and increased friction coefficient.

The aramid fiber of this invention is made from aromatic polyamide fiber, wherein at least 85% of the amide (—CONH—) linkages are attached directly to two aromatic rings. Additives can be used with the aramid; and it has been found that up to as much as 10 percent by weight of other polymeric material can be blended with the aramid or that copolymers can be used having as much as 10 percent of other diamine substituted for the diamine of the aramid or as much as 10 percent of other diacid chloride substituted for the diacid chloride of the aramid. Para-aramids are the primary polymers in fibers of this invention and poly(p-phenylene terephthalamide)(PPD-T) is the preferred para-aramid. Meta-aramids, also, may find use in the fibers of this invention and poly(m-phenylene isophthalamide)(MPD-I) is the preferred meta-aramid.

The aramid fiber of this invention can be floc or pulp. Aramid floc is made by cutting long aramid fibers, such as those prepared by processes described in U.S. Pat. Nos. 3,063,966, 3,133,138, 3,767,756, and 3,869,430.

The aramid pulp is made by refining floc or can be made directly from ingredients as was taught in U.S. Pat. No. 5,202,184. By "pulp" is meant particles of aramid material having a stalk and fibrils extending therefrom wherein the stalk is generally columnar and about 10 to 50 microns in diameter and the fibrils are hair-like members only a fraction of a micron or a few microns in diameter attached to the stalk and about 10 to 100 microns long. In paper manufacture, the fibrils on pulp are important to act as hooks or fasteners to hold adjacent particles in the paper and provide integrity to the paper construction.

Paper can also be made using a combination of aramid floc and aramid fibrids wherein the fibrids serve to hold together the floc and other paper components.

Aramid fibrids are sometimes used as binder materials for the purpose of this invention. Fibrids are not fibers. The term "aramid fibrids" refers to non-granular film-like particles of aromatic polyamide having a melting point or decomposition point above 320° C. The fibrids have an average length of 0.2 to 1 mm with a length-to-width aspect ratio of 5:1 to 10:1. The thickness dimension is on the order of a fraction of a micron. Such aramid fibrids, before being dried, can be used wet and can be deposited as a binder physically entwined about the aramid floc component of a paper. The fibrids in paper of this invention can be prepared using a fibridating apparatus of the type disclosed in U.S. Pat. No. 3,018,091 where a polymer solution is precipitated and sheared in a single step.

Although the length of pulp particles is a direct consequence of the length of the starting floc, pulp and floc generally have a length of about 0.15 to 10 millimeters. Surface area is an important characteristic of pulp to be used in this invention because the surface area is a measure of the degree of fibrillation and influences the porosity of the paper and the effective area available for interfiber bonding. The surface area of pulp used herein is 0.5 to 20 square meters per gram, and the surface area for floc is 0.08 to 0.6 square meters per gram. Because floc lacks the fibrillation of pulp, paper made with floc often, also, has a binder such as fibrids, among the paper components.

The Canadian Standard Freeness of the pulp as measured per TAPPI test T 227 om-92, which is a measure of its drainage characteristics, varies from 100 ml to 800 ml. Also, the % retained on the 14 mesh screen of a Clark Classifier as per TAPPI test T 233 cm-82, is used as a measure of length for fibers. That amount is to 0 to 15% for pulp used in this invention.

Chitosan is an aminopolysaccharide usually prepared by deacetylation of chitin (poly-beta(1,4)-N-acetyl-D-glucosamine) obtained from marine organisms (shrimp, crabs, lobsters, squid, and the like). The degree of deacetylation is generally reported as a percentage of the amine groups that are deacetylated and is generally greater than 50 percent. The molecular weight of chitosan is a function of its source and processing history. A measure of the molecular weight is obtained through measurement of intrinsic viscosity in 0.3 M acetic acid with 0.2 M sodium acetate or by measuring the viscosity of a one percent solution of chitosan in 1 percent acetic acid at 25° C. The viscosity of chitosan used in this invention varies from 10 mPa-sec to 22,000 mPa-sec and the intrinsic viscosity varies from 4 to 20 dl/g. The chitosan can be used as a solution in acids, such as acetic, lactic and citric acids, or can be used in the form of salts with these acids, such as acetate, lactate and citrate.

The process of this invention involves coating aramid fibers with chitosan either in a separate process or as a part of a paper-making process. As a separate process, chitosan is dissolved in water in the form of acetate, citrate, lactate, hydrochloride, and the like at a pH on the acid side—preferably 2.5–4.5 or slightly higher at a concentration of about 1 to 10 weight percent, based on weight of the aramid fibers, are dispersed therein. The pH of the dispersion is then increased to 6.5 to 11 by addition of a base. The preferred base is sodium hydroxide but any appropriate base can be used. Raising the pH causes the chitosan to precipitate onto the aramid fibers—thus coating them. If desired, for any reason, the chitosan can be dissolved in water which already has the aramid fibers dispersed therein;—the order of addition making no difference in preparation of the coated aramid fiber product.

As was previously stated, aramid pulp is aramid floc which has been refined to produce fibrils. The process of this invention can also be practiced by establishing a dispersion of aramid floc in a chitosan solution; and refining the floc to pulp in that solution before increasing the pH, removing the water, and recovering a chitosan-coated aramid pulp product.

As a part of a paper-making process, a dispersion, or paper furnish, including aramid fibers coated at a concentration of 1 to 10 weight percent chitosan, based on weight of dry aramid fibers, is poured onto a paper-making screen, water of the furnish is removed from the fibers, and the fibers are dried to yield a paper. The paper is usually 5 to 95 percent aramid fibers, based on the weight of the paper and the aramid fibers are usually aramid pulp already coated with chitosan. Although not preferred, the invention can be practiced by adding chitosan to a paper furnish which includes aramid fibers, and then coating the fibers with chitosan by increasing the pH of the furnish to 6.5–11 to precipitate the chitosan. In this embodiment, chitosan is added in an amount which, on precipitation, will result in a coating, on the aramid fibers, of 1 to 10 percent, based on the weight of the fibers.

It has been found to be a good practice to increase the pH of the furnish to 6.5 to 11 whether the aramid fibers are coated with chitosan in the furnish or before being added to the furnish.

The coated aramid fibers of this invention find use, among other uses, in friction paper. Friction paper is paper which is used in power transmission clutch facings and transmission bands to provide smoother engagements, better cooling efficiency and overall improvement in transmission performance. Friction papers of this invention generally include reinforcing fibers in the form of pulp or floc, binders, and fillers. The friction papers are usually impregnated with resins, such as phenolic or silicone resins or combinations thereof to make clutch facings. The friction papers generally have about 5 to 95%, by weight, pulp or floc, 15 to 85% filler and 0 to 10% binders, with 0 to 30% other components. The pulp or floc is the coated aramid fiber of this invention. The fillers can be inorganic materials such as diatomaceous earth, talc, carbon, and the like. The other components can include other fibers, such as glass fibers, or ceramic fibers, and the like.

The paper of this invention includes 1 to 10 percent, by weight, chitosan. The chitosan increases the friction coefficient of the paper of this invention by a surprising amount as compared with similar friction papers having no chitosan; and the chitosan significantly enhances the strength of the paper. It is the chitosan on the fibers and in the paper of this invention which is considered to impart patentability.

TEST METHODS

Friction Testing Procedure

Sheets were tested for sliding friction coefficient using a Kayness friction tester made by Kayness, Inc., Morganstown Pa. 19543. The usual testing force was increased from 200 grams to 1456 grams by adding additional weight to increase the sensitivity of the measurement. Care was exercised to ensure that the stainless steel table was clean for each measurement and the sample surface and stainless table top were not contaminated. The samples for testing were cut using a 6.3 centimeters by 11.4 centimeters template with a "V" notch as recommended in the Kayness friction testing procedure. Each sample was wrapped around the bottom of the rectangular testing weight and taped securely. The weight was positioned at the same spot on the stainless table for each test. The force gage was set to zero for each test run and the machine was adjusted to a linear speed 15.2±0.2 centimeters per minute. For each test, the weight was allowed to slide approximately 14 centimeters before the machine was stopped and the frictional force on the gage was noted. For each sheet, four samples were tested unless otherwise noted in the Tables. For each sample, five frictional force readings were taken. Friction coefficient is the ratio of the frictional force and the normal force. The normal force is equal to the weight. The sliding friction coefficient was calculated by dividing the frictional force by 1456. The twenty coefficients thus obtained were averaged and the standard deviation calculated and reported in the Tables. The laboratory temperature during those tests was about 23° C.

Procedure for Determination of Chitosan in Paper

The amount of chitosan left on paper samples was determined by the following procedure. One gram of a dry paper sample was weighed to the nearest 0.0001 g. The sample was then cut into small pieces and placed in a 500 ml beaker with 250 ml of 1% acetic acid. The contents of the beaker were heated while stirring to 55°–60° C. for 60 minutes. The beaker and its contents were then cooled in an ice bath to less than 30° C. The beaker contents were then filtered and the filtrate was evaporated to dryness in a tared container in a vacuum oven at 130° C. and the residue was further dried by placing the container in a forced air oven for 30 minutes at 130° C. The container and the residue was placed in a dessicator to cool and was then weighed. As a blank, 250 ml of 1% acetic acid with no paper sample was run using the procedure above. The residue weight was calculated as follows:

Residue Weight=Weight of (Container+Residue)−Weight of Container−Weight of 1% acetic acid blank The percent chitosan was determined as follows:

% Chitosan=(Residue Weight/1.37)/Sample Weight

The factor 1.37 was used to account for the difference between chitosan and chitosan acetate and is the ratio of the molecular weight of chitosan acetate to chitosan.

EXAMPLE 1

Papers for friction testing were prepared by the following procedure, using a 20 centimeter by 20 centimeter laboratory handsheet mold. Each handsheet was prepared with 85% by weight of para-aramid floc with a linear density of 2.0 dtex and a length of about 6.4 millimeters and 15% by weight of a refined meta-aramid fibrid binder. The para-aramid floc was a poly(p-phenylene terephthalamide) fiber product sold by E. I. du Pont de Nemours and Company under the tradename KEVLAR®49. The meta-aramid fibrids were made from poly(meta-phenylene isophthalamide) as described in U.S. Pat. No. 3,756,908 and had a Kajaani FS100 Numerical Average length of 0.49 mm and a freeness of 341 ml. In addition, various amounts of chitosan were added to the paper furnish to generate the papers identified in Tables I and II. Papers in Table I were produced using a high molecular weight chitosan and those in Table II were produced using a low molecular weight chitosan. The high molecular weight chitosan was supplied by DCV Chitin Technologies L.P. under the tradename VNS-618 as a one weight percent chitosan in aqueous solution with one weight percent acetic acid and having a one percent solution viscosity at 25° C., of 11,400 mPa-sec, an intrinsic viscosity of about 12.5 dl/g, and an 85.7 percent degree of deacetylation. The low molecular weight chitosan was supplied by DCV Chitin Technologies L.P. under the tradename VNS-589 as three weight percent chitosan in aqueous solution with three weight percent acetic acid and having a one percent viscosity, at 25° C., of 14 mPa-sec and a 78.9 percent degree of deacetylation.

For each sheet, 1000 ml of water was poured into a British Pulp Evaluation Apparatus (BPEA) and 0.4389 gram on dry basis, of the aforementioned polymetaphenylene-isophthalamide (MPDI) fibrids was added as a 0.3% aqueous slurry. 2.4871 grams on dry basis, of about 6 mm long, 12 micron diameter, polyparaphenylene terephthalamide floc was added to this mix along with the appropriate amount of chitosan. An additional 1000 ml of water was added to the BPEA. The dispersion was thoroughly agitated for 5 minutes. The handsheet mold was filled with 8000 ml of water and the dispersion was poured into the mold. A vacuum was applied to the mold to remove water and form the sheet. Each sheet was taken out of the mold, blotted and dried at 190° C. The sheets were then pressed in a flat press at 446° C. and 285 KNewtons for one minute. Basis weight and thickness measurements were then made on each sheet and the sheets were used for friction testing as shown below.

TABLE I

| % Chitosan Added | % Chitosan on Paper | Basis Wt. (g/m²)* | Density (g/cc) | Friction Coefficient Mean | Friction Coefficient St dev. |
| --- | --- | --- | --- | --- | --- |
| 0 | 0 | 67.5 | 0.305 | 0.164 | 0.002 |
| 1 | 0.71 | 69.2 | 0.306 | 0.165 | 0.002 |
| 2 | 1.38 | 68.2 | 0.286 | 0.167 | 0.002 |
| 4 | 2.00 | 69.2 | 0.301 | 0.172 | 0.002 |
| 6 | 3.01 | 72.9 | 0.315 | 0.178 | 0.002 |

TABLE II

| % Chitosan Added | % Chitasan on Paper | Basis Wt. (g/m²)* | Density (g/cc) | Friction Coefficient Mean | Friction Coefficient St dev. |
| --- | --- | --- | --- | --- | --- |
| 0* | 0 | 65.1 | 0.262 | 0.165 | 0.002 |
| 1 | 1.21 | 66.2 | 0.260 | 0.174 | 0.002 |
| 2 | 1.73 | 66.8 | 0.254 | 0.172 | 0.002 |
| 4 | 1.73 | 66.1 | 0.266 | 0.173 | 0.004 |
| 6** | 2.52 | 66.8 | 0.263 | 0.173 | 0.003 |

*Only ten friction readings were taken with this paper.
**Only fifteen friction readings were taken with this paper.

Examples 2, 3 and 4 below show the effect on paper strength of pulp coated with various levels of chitosan to friction papers containing different amounts of pulp.

For each sheet, PPD-T pulp and 0.393 gms of cotton linters (purchased from Alpha Cellulose Corporation) on a dry basis was added to approximately 1500 ml of water and mixed in a British Pulp Evaluation Apparatus (BPEA) for 5 minutes. The PPD-T pulp had a Kajaani FS-200 length weighted average length of about 0.61 mm, an arithmetic average length of about 0.18 mm, and a weight weighted average length of about 1.48 mm. For purposes of establishing the preferred average length for practice of this invention, the length weighted average length is used. The chitosan coated pulps were prepared by adding the required amount of chitosan as a 1% solution in a one percent acetic acid in water to the pulp dispersed in water using a BPEA and was then neutralized to a pH above 8.0. The chitosan used here was the same high molecular weight chitosan (VNS618) used in Example 1. The amount of chitosan was calculated based on the weight percent of pulp on a dry basis. The appropriate amount of activated carbon and diatomaceous earth based on weight percent dry basis of paper were added and mixed for 5 minutes. The pH of the mixture at this stage was between 9 and 10 for all papers. 0.098 g of nitrile latex was added to the mixture while it was being stirred and 11 gms of a 6% solution of alum in water were added to precipitate the latex onto the furnish ingredients. The pH of the furnish was between 5 and 6 in all cases. Approximately 10 g of a Bubond 65 cationic retention aid (purchased from Buckman Laboratories) was added as 0.44% solution. The furnish was poured into an approximately 20×20 centimeter handsheet mold filled with 8000 ml of water. A vacuum was applied to the mold to remove water and form the sheet. Each sheet was taken out of the mold, blotted and couched with a roller and dried at about 120° C. Basis weight and thickness measurements were made on each sheet and the tensile strength measured in an Instron tensile tester at a gage length of about 5 cm with a strip width of about 2.5 cm.

EXAMPLE 2

| (45% pulp papers) | | |
| --- | --- | --- |
| Ingredient | % Dry Basis | Amount g Dry Basis |
| Pulp | 45 | 4.16 |
| Activated Carbon | 35 | 3.435 |
| Diatomaceous Earth | 15 | 1.472 |
| Cotton Linters | 4 | 0.393 |
| Nitrile Latex | 1 | 0.098 |

-continued (45% pulp papers)

| Ingredient | % Dry Basis | Amount g Dry Basis | | |
|---|---|---|---|---|
| % Chitosan on Pulp | Basis Weight (g/(m$^2$)) | Thickness (mm) | Density | Tensile Strength (kg/cm$^2$) | T.S./ Density |
| 0 | 219 | 0.778 | 0.282 | 6.75 | 23.96 |
| 2 | 235 | 0.882 | 0.266 | 8.72 | 32.72 |
| 4 | 218 | 0.778 | 0.280 | 11.74 | 41.94 |
| 6 | 230 | 0.896 | 0.257 | 9.98 | 38.92 |

EXAMPLE 3

(33% pulp papers)

| Ingredient | % Dry Basis | Amount g Dry Basis | | |
|---|---|---|---|---|
| Pulp | 33 | 3.238 | | |
| Activated Carbon | 47 | 4.612 | | |
| Diatomaceous Earth | 14 | 1.472 | | |
| Cotton Linters | 4 | 0.392 | | |
| Nitrile Latex | 1 | 0.098 | | |
| % Chitosan on Pulp | Basis Weight (g/(m$^2$)) | Thickness (mm) | Density | Tensile Strength (kg/cm$^2$) | T.S./ Density |
| 0 | 218 | 0.746 | 0.292 | 4.50 | 15.39 |
| 2 | 209 | 0.746 | 0.279 | 6.75 | 24.21 |
| 4 | 219 | 0.755 | 0.290 | 6.82 | 23.50 |
| 6 | 222 | 0.819 | 0.272 | 6.96 | 25.60 |

EXAMPLE 4

(20% Pulp Papers)

| Ingredient | % Dry Basis | Amount g Dry Basis | | |
|---|---|---|---|---|
| Pulp | 20 | 1.963 | | |
| Activated Carbon | 60 | 5.888 | | |
| Diatomaceous Earth | 15 | 1.472 | | |
| Cotton Linters | 4 | 0.393 | | |
| Nitrile Latex | 1 | 0.098 | | |
| % Chitosan on Pulp | Basis Weight (g/(m$^2$)) | Thickness (mm) | Density | Tensile Strength (kg/cm$^2$) | T.S./ Density |
| 0 | 210 | 0.636 | 0.330 | 3.52 | 10.64 |
| 2 | 205 | 0.645 | 0.318 | 3.80 | 11.93 |
| 4 | 188 | 0.596 | 0.316 | 4.92 | 15.60 |
| 6 | 202 | 0.641 | 0.316 | 5.41 | 17.15 |

EXAMPLE 5

For each sheet, PPD-T pulp, as was used in the previous examples, and 0.88 g of cotton linters were added to approximately 1500 ml of water, mixed in a Waring Blendor for 5 minutes, and transferred to a BPEA. Chitosan coated pulps were prepared by adding the required amount of chitosan as a 1% solution in one percent acetic acid in water to the pulp dispersion in a vessel and then neutralizing the dispersion to a pH of about 10 or above. The chitosan used here was the same high molecular weight chitosan (VNS618) used in Example 1. The amount of chitosan was calculated based on the weight of pulp on a dry basis. The appropriate amount of activated carbon and diatomaceous earth, based on dry weight basis of paper, were added and mixed for 5 minutes. 0.44 g of nitrile latex was added to the mixture while it was being stirred and 25 g of a 5% solution of alum in water were added to precipitate the latex onto the furnish ingredients. Approximately 25 g of Bubond 65 cationic retention aid was added as a 25% solution. The resulting furnish was poured into an approximately 30×30 centimeter handsheet mold. The handsheet mold was filled with approximately 34 liters of water and the furnish was poured into the mold. A vacuum was applied to the mold to remove water and form the sheet. Each sheet was taken out of the mold, couched and then pressed and dried at about 120° C. Thickness measurements were made on each sheet and the tensile strength measured in an Instron tensile tester at a gage length of about 12.7 cm with a strip width of about 2.5 cm. A control was run using the same procedure as set out above, but with no chitosan.

| Ingredient | % Dry Basis | g Dry Basis | | |
|---|---|---|---|---|
| Pulp | 33 | 7.28 | | |
| Activated Carbon | 46 | 10.14 | | |
| Diatomaceous Earth | 15 | 3.31 | | |
| Cotton Linters | 4 | 0.88 | | |
| Nitrile Latex | 2 | 0.44 | | |
| % Chitosan on Pulp | Thickness (mm) | Tensile Strength (kg/cm$^2$) | T.S./ T.S. at 0% | |
| 0% | 0.761 | 3.02 | 1 | |
| 0.1 | 0.696 | 4.08 | 1.35 | |
| 0.5 | 0.759 | 7.31 | 2.42 | |
| 1.0 | 0.716 | 7.45 | 2.47 | |
| 5.0 | 0.756 | 7.52 | 2.49 | |

EXAMPLE 6

These papers were made in a fashion similar to that of Example 5 but the pulp used here was longer, had a Canadian Standard Freeness of 629 ml, and a surface area of 4.36 m$^2$/g with a 14 mesh Clark retention of 10.0%. The pulp had a Kajaani FS-200 length weighted average length of about 1.03 mm, an arithmetic average length of about 0.20 mm, and a weight weighted average length of about 2.63 mm.

(33% Pulp Papers)

| % Chitosan | Basis Weight (g/(m$^2$)) | Thickness (mm) | Density | Tensile Strength (kg/cm$^2$) | T.S./ Density |
|---|---|---|---|---|---|
| 0 | 201 | 0.691 | 0.291 | 3.52 | 12.10 |
| 0.1 | 207 | 0.728 | 0.285 | 5.89 | 20.68 |
| 0.5 | 174 | 0.627 | 0.277 | 6.27 | 22.60 |
| 1.0 | 193 | 0.717 | 0.268 | 5.23 | 19.47 |

EXAMPLE 7

These papers were the same composition as those in Example 5 made with the same pulp but had an additional 0.45% of latex added to the paper; and, in two cases, the chitosan was added directly to the furnish rather than coated on the pulp before adding the pulp to the furnish. These results indicate the chitosan coated on the pulp before the paper-making process is much more effective in improving strength.

| % Chitosan | Basis Weight (g/(m²)) | Thickness (mm) | Density | Tensile Strength (kg/cm²) | T.S./ Density |
|---|---|---|---|---|---|
| 0 | 206 | 0.648 | 0.318 | 5.76 | 18.14 |
| 2% of pulp added to furnish | 229 | 0.841 | 0.272 | 4.88 | 17.93 |
| 3% of pulp added to furnish | 226 | 0.742 | 0.304 | 8.43 | 27.69 |
| 1.5% on pulp (wet) | 225 | 0.845 | 0.26S | 6.76 | 25.45 |

EXAMPLE 8

These papers were prepared similar to Example 5, but with a composition as shown below. Also, the molecular weights of chitosan as indicated by the viscosity of 1% solution in 1% acetic acid were different. The 5700 cps chitosan was obtained from DCV Chitin Technologies L.P. as a lactate solution with a designation of RNS-049 and had an intrinsic viscosity of 9.5 dl/g.

| Ingredient | % Dry Basis | Amount g Dry Basis |
|---|---|---|
| Pulp | 33 | 3.238 |
| Activated Carbon | 47 | 4.612 |
| Diatomaceous Earth | 15 | 1.472 |
| Cotton Linters | 4 | 0.392 |
| Nitrile Latex | 1 | 0.098 |

| % Chitosan | Basis Weight (g/(m²)) | Thickness (mm) | Density | Tensile Strength (kg/cm²) | T.S./ Density |
|---|---|---|---|---|---|
| None | 222 | 0.752 | 0.297 | 4.29 | 14.44 |
| 11,400 cps (85.7% DEA) VNS-618 | 244 | 0.838 | 0.296 | 6.89 | 23.28 |
| 5700 tps (83.2% DEA) RNS-049 | 240 | 0.863 | 0.277 | 6.05 | 21.83 |

| Ingredient | | % Dry Basis | | Amount g Dry Basis | |
|---|---|---|---|---|---|
| 5700 cps (83.2% DEA) RNS-049 | 244 | 0.813 | 0.303 | 6.47 | 21.35 |

EXAMPLE 9

This example demonstrates the benefit of using fibers which have been coated with chitosan in accordance with this invention, rather than merely mixed with chitosan. In this example, 7.28 g of PPD-T pulp were dispersed in 1500 ml of water and the required amount of chitosan was added thereto as a 1% solution in one percent acetic acid in water. In one case indicated below, the pulp dispersion was neutralized to a pH of about 8 to precipitate the chitosan, and the water was evaporated from the dispersion to yield dry, chitosan-coated pulp.

In the other cases below, the water was evaporated from the dispersion of pulp and unneutralized chitosan to yield a dry mixture of pulp and chitosan.

Papers were made by the procedure of Example 5 using these pulp and chitosan components with results set out in the Table below:

| Chitosan % on Pulp | Thickness (mm) | Density | Tensile Strength (kg/cm²) | T.S./ Density |
|---|---|---|---|---|
| 2% Neutralized to pH 8 and then dried | 0.927 | 0.351 | 7.49 | 21.35 |
| 1% Dried | 0.953 | 0.335 | 5.80 | 17.31 |
| 2% Dried | 0.940 | 0.356 | 5.38 | 15.11 |
| 3% Dried | 0.978 | 0.347 | 5.86 | 16.90 |

What is claimed is:

1. Aramid fibers having a length of 0.15 to 10 millimeters, a surface area of 0.5 to 20 square meters per gram and a coating of chitosan in the amount of 1 to 10 percent, based on the weight of the fibers.

2. The fibers of claim 1 wherein the chitosan has a 1% solution viscosity in 1% acetic acid of 10–22,000 mPa-sec.

3. The fibers of claim 1 wherein the fibers are aramid floc.

4. The fibers of claim 1 wherein the fibers are aramid pulp.

* * * * *